(No Model.)
G. E. DUDLEY.
COMBINATION FUNNEL AND COFFEE PERCOLATOR AND STRAINER.
No. 496,510. Patented May 2, 1893.
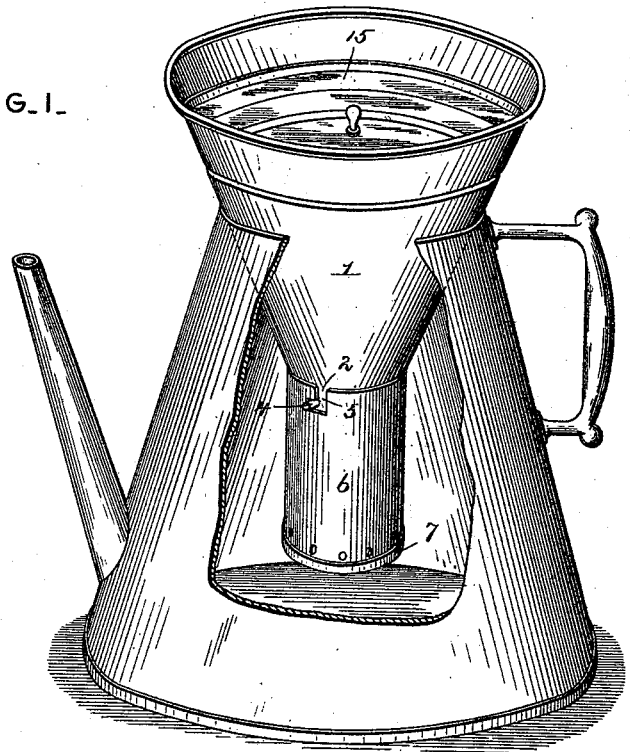
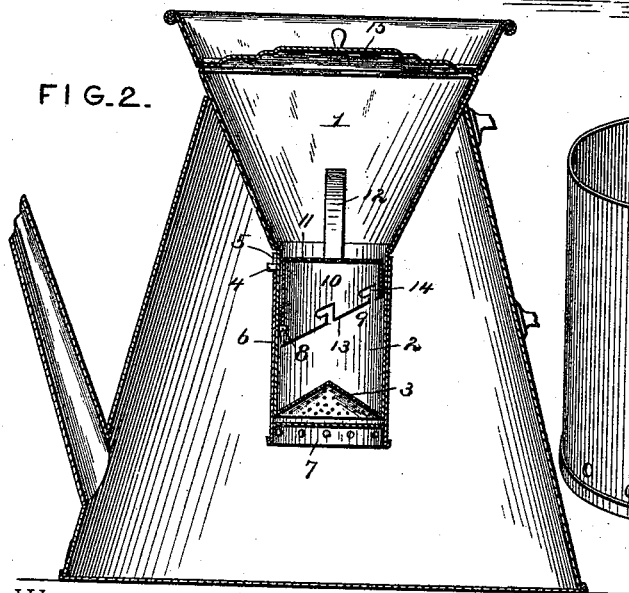
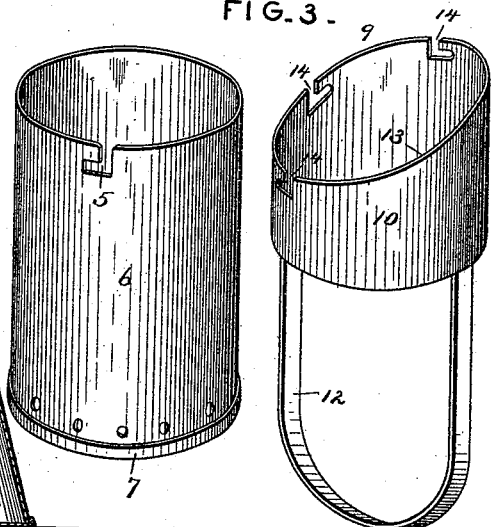
Witnesses
Harry L. Amer.
Chas. S. Hyer.
Inventor
George E. Dudley.
By his Attorneys,
C. A. Snow & Co.

United States Patent Office.

GEORGE E. DUDLEY, OF CAÑON CITY, COLORADO.

COMBINATION FUNNEL AND COFFEE PERCOLATOR AND STRAINER.

SPECIFICATION forming part of Letters Patent No. 496,510, dated May 2, 1893.

Application filed January 21, 1893. Serial No. 459,218. (No model.)

*To all whom it may concern:*

Be it known that I, GEORGE E. DUDLEY, a citizen of the United States, residing at Cañon City, in the county of Fremont and State of Colorado, have invented a new and useful Combination Funnel and Coffee Percolator and Strainer, of which the following is a specification.

This invention relates to combined funnel, percolator, and strainer, and has for its object to provide a device of the character set forth wherein the parts are unitedly used as a percolator for use in connection with drugs and herbs, as well as making tea, coffee, and other beverages of a kindred nature, or the parts separated in such a manner as to form a strainer that can be used alone and in connection with large cans, jars, kegs, and barrels for filling the same, or be left therein for the purpose of admitting air to the same and prevent the ingress of flies or other insects, as is required in making vinegar and analogous liquors; and with this object in view, the invention consists of the construction and arrangement of the parts as will be more fully hereinafter described and claimed.

In the drawings: Figure 1 is a perspective view of the device arranged as a percolator, and shown positioned in a coffee pot, the latter being broken away. Fig. 2 is a transverse vertical central section of the device. Fig. 3 is a perspective view of parts of the device detached from each other.

Similar numerals of reference indicate corresponding parts in the several figures of the drawings.

Referring to the drawings, the numeral 1 designates a conical or hopper-shaped body, having a depending cylindrical tube 2, with a conical strainer 3 in the bottom thereof projecting upwardly thereinto; and the device as thus far described, and clearly shown, is adapted for use either as a strainer or a funnel, or may be positioned in suitable receptacles or vessels, in the mouths or bung-holes thereof, to permit the ingress of air to the contents of said vessels or receptacles and exclude the ingress of flies or other insects. A pin or stud 4 projects outwardly from the upper portion of the cylindrical tube 2, and is adapted to be engaged by a bayonet slot 5, in the upper edge of a metallic cup 6, that is removably fitted over the said cylindrical tube 2, and has a lower rim 7 that depends below the bottom of the same, supplied with a series of perforations, arranged circumferentially and in alignment, and prevent the said rim from becoming heated to too great an extent, which would materially interfere with the handling of the same, as will be readily understood. The said cup is adapted to be used to macerate the coffee a little while before the hot water is poured through it, and of course has to be removed after maceration and before the coffee is made. This cup is also adapted to be used for measuring the quantity of coffee or other material to be placed within the tube 2, as the dimensions of the said cup closely approximate those of the said tube, thereby making it very convenient in quickly supplying the said tube 2 with a quantity of material equal to its capacity.

Projecting from the interior surface of the cylindrical tube 2, is another stud or pin 8, positioned at a suitable elevation, and provides a stop for a follower 9, consisting of a cylindrical body 10, with an upper strainer 11 across the top of the same, and having a handle 12, whose lower ends are secured against the inner surface of the said body to obviate exterior projection and cause a close fitting of the exterior surface of the said body 10, against the interior surface of the cylindrical tube 2. The said body 10 is cut obliquely across at the lower end thereof, as at 13, thereby providing an inclined edge disposed at an angle to the sides of the cylindrical tube 2 and of the said body 10. The said inclined lower edge of the body 10 is formed with a series of bayonet slots 14, arranged at varying elevations, so that the follower as a whole may be readily placed within the cylindrical tube 2, over the coffee or other material therein located, and the bayonet slots 14 caused to engage the pin or stud 8 and hold the said follower closely against the coffee or other material within the said tube 2, to prevent the same from being blown upward by the action of the steam and cause a close confinement of the grounds within the said tube 2. Further, by the use of the follower, as set forth, the grounds are confined in compact form and a more thorough percolation of the hot water therethrough, and extraction of the essence thereof and the formation of the desired beverage, results. In this connection it will be observed that the hot water is caused to pass through the strainer 11, then through the grounds or macerated material confined within the tube 2 by the follower, and thence passes out through the conical strainer 3, into a suitable vessel below. The cone 3 gives an inclined surface for the coffee or other material to move upon when it is swelling, as will necessarily result when hot water is poured thereon or comes into contact therewith, thus preventing in the best possible manner the strainer from getting clogged, and causing the entire device to work properly and accurately. A cover 15 is supplied for the device and fits against the rim in the upper portion of the body 1, and which will be employed when the device is used as a percolator, in the formation of beverages, or in the extraction of the essence from herbs and other materials.

The tube 2 is placed within and secured to the lower part of the body 1, so that the follower is permitted to work up and down to the bottom without obstruction.

Changes in the form, proportion, and the minor details of construction may be resorted to without departing from the principle or sacrificing any of the advantages of this invention.

Having described the invention, what is claimed as new is—

1. In a device of the character set forth, the combination of a body having a depending tube provided with a pin or post projecting outwardly from the upper portion thereof, and a cup removably applied to the said tube having a lower perforated rim and an upper bayonet slot to removably engage said pin or post, said cup having a closed bottom adapted to fit against the bottom of said tube, substantially as described.

2. In a device of the character set forth, the combination of a body having a depending tube provided with an upwardly-projecting conical strainer at the bottom thereof, and a pin or post extending inwardly from the interior surface of the same, and a follower having the bottom thereof cut off at an angle of inclination and supplied with a series of bayonet slots adapted to engage the said pin or post, said follower having a handle for pressing the same downward into the said tube, substantially as described.

3. In a device of the character set forth, the combination of a body having a depending tube provided with an upwardly-projecting conical strainer at the bottom thereof, a pin or post at the upper portion and projecting exteriorly from the same, another interiorly-positioned pin or post, a cup removably fitted to the said tube and having a closed bottom, and a follower removably fitted in the said tube and supplied with a body cut obliquely across the lower end thereof and formed with a series of bayonet slots arranged at varying elevations adapted to engage the said interiorly-positioned pin or post and also supplied with a handle, substantially as described.

In testimony that I claim the foregoing as my own I have hereto affixed my signature in the presence of two witnesses.

GEORGE E. DUDLEY.

Witnesses:
JOS. P. TYO,
HOWARD C. DUDLEY.